United States Patent
Tiirola et al.

(10) Patent No.: US 12,542,630 B2
(45) Date of Patent: Feb. 3, 2026

(54) UPLINK CARRIER AGGREGATION IN LOW MAXIMUM POWER REDUCTION MODE FOR WIRELESS NETWORKS

(71) Applicant: Nokia Technologies Oy, Espoo (FI)

(72) Inventors: Esa Tapani Tiirola, Oulu (FI); Kari Juhani Hooli, Oulu (FI); Ismael Peruga Nasarre, Madrid (ES); Oskari Tervo, Oulu (FI); Mikko Valkama, Nokia (FI); Juha Yli-Kaakinen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 349 days.

(21) Appl. No.: 18/320,050

(22) Filed: May 18, 2023

(65) Prior Publication Data
US 2024/0072948 A1  Feb. 29, 2024

(30) Foreign Application Priority Data
Aug. 30, 2022  (FI) .................................... 20225760

(51) Int. Cl.
*H04L 5/00* (2006.01)
(52) U.S. Cl.
CPC ................... *H04L 5/001* (2013.01)
(58) Field of Classification Search
None
See application file for complete search history.

(56) References Cited

U.S. PATENT DOCUMENTS

| 8,055,294 B2 | 11/2011 | Lee et al. | |
|---|---|---|---|
| 2007/0149249 A1* | 6/2007 | Chen | H04L 5/0007 455/561 |
| 2010/0091678 A1* | 4/2010 | Chen | H04B 7/024 370/252 |

(Continued)

FOREIGN PATENT DOCUMENTS

| EP | 3280193 A1 | 2/2018 |
|---|---|---|
| EP | 3284301 A1 | 2/2018 |

(Continued)

OTHER PUBLICATIONS

Bergljung—U.S. Appl. No. 63/104,212 Provisional Application (Year: 2020).*

(Continued)

*Primary Examiner* — Andre Tacdiran
(74) *Attorney, Agent, or Firm* — Lippes Mathias LLP

(57) ABSTRACT

According to example embodiments, a method may include transmitting, by a user device to a wireless network node, data via a plurality of uplink component carriers including at least a first uplink component carrier and a second uplink component carrier; wherein a first subset of physical resource blocks for the first component carrier is contiguous with a second subset of physical resource blocks for the second component carrier; wherein the first component carrier and the second component carrier have a same power spectral density; and applying a modified radio frequency requirement by the user device wherein the modified radio frequency requirement impacts a transmission power of the first uplink component carrier and of the second uplink component carrier.

19 Claims, 7 Drawing Sheets

Example Wireless Network 130

(56) References Cited

U.S. PATENT DOCUMENTS

| | | | | |
|---|---|---|---|---|
| 2011/0081913 | A1* | 4/2011 | Lee | H04L 5/003 |
| | | | | 455/450 |
| 2011/0268071 | A1* | 11/2011 | Siew | H04L 1/0003 |
| | | | | 370/344 |
| 2012/0250558 | A1* | 10/2012 | Chung | H04L 5/0098 |
| | | | | 370/252 |
| 2016/0242153 | A1* | 8/2016 | Chen | H04L 5/0098 |
| 2018/0255553 | A1* | 9/2018 | Gaal | H04L 5/0007 |
| 2018/0351724 | A1* | 12/2018 | Wang | H04L 5/0037 |
| 2019/0044811 | A1* | 2/2019 | Miao | H04L 5/001 |
| 2019/0229967 | A1* | 7/2019 | Frank | H04L 27/2614 |
| 2020/0260420 | A1* | 8/2020 | Bala | H04L 27/0008 |
| 2021/0075563 | A1 | 3/2021 | Cheng et al. | |
| 2021/0377108 | A1 | 12/2021 | Cho et al. | |
| 2022/0085934 | A1* | 3/2022 | Choi | H04W 72/0446 |
| 2023/0198690 | A1* | 6/2023 | Yang | H04L 5/0044 |
| | | | | 370/329 |
| 2023/0413192 | A1* | 12/2023 | Bergljung | H04W 52/367 |

FOREIGN PATENT DOCUMENTS

| | | | |
|---|---|---|---|
| WO | WO2011081505 A2 | * | 1/2011 |
| WO | 2016/186751 A1 | | 11/2016 |
| WO | WO2018107977 | * | 11/2017 |
| WO | 2022/011698 A1 | | 1/2022 |
| WO | WO2013115510 | * | 1/2023 |

OTHER PUBLICATIONS

"New WI: Further NR coverage enhancements", 3GPP TSG RAN Meeting #94e, RP-213579, Agenda: 8.6.1, China Telecom, Dec. 6-17, 2021, 5 pages.

"New WID: MIMO Evolution for Downlink and Uplink", 3GPP TSG RAN Meeting #94e, RP-213598, Agenda: 8A.1, Samsung, Dec. 6-17, 2021, 6 pages.

"3rd Generation Partnership Project; Technical Specification Group Radio Access Network; NR; User Equipment (UE) radio transmission and reception; Part 1: Range 1 Standalone (Release 17)", 3GPP TS 38.101-1, V17.5.0, Mar. 2022, 669 pages.

"Discussion on 2UL Allocation Types and their Impact on Required PA Back-off and MSD", 3GPP TSG-RAN WG4 Meeting 92, R4-1908815, Agenda: 9.12, Skyworks Solutions, Inc, Aug. 26-30, 2019, 8 pages.

"Revised WID on RF requirements for NR frequency range 1", 3GPP TSG RAN Meeting #84, RP-191114, Agenda: 9.4.20, Huawei, Jun. 3-6, 2019, 4 pages.

"Initial Measurement Results for Intra-band Contiguous NR UL CA for FR1", 3GPP TSG-RAN WG4 Meeting 92, R4-1908839, Agenda: 9.12.4, Skyworks Solutions, Inc, Aug. 26-30, 2019, 9 pages.

"Channel spacing for intra-band contiguous CA", 3GPP TSG-RAN WG4 Meeting #85, R4-1712970, Agenda: 9.3.1.2, Huawei, Nov. 27-Dec. 1, 2017, 3 pages.

"Carrier aggregation", TSG-RAN WG1 #54bis, R1-083750, Agenda: 11, Ericsson, Sep. 29-Oct. 3, 2008, 4 pages.

"Physical layer technologies for LTE-Advanced", 3GPP TSG RAN WG1#53, R1-081838, Agenda: 6.2, Huawei, May 5-9, 2008, 8 pages.

"Carrier aggregation in LTE-Advanced", TSG-RAN WG1 #53bis, R1-082468, Agenda: 12, Ericsson, Jun. 30-Jul. 4, 2008, 6 pages.

"Uplink multiple access schemes for Lte-A", 3GPP Tsg Ran WG1 #54bis, R1-083658, Agenda: 11, LG Electronics, September 29th - Oct. 3, 2008, 12 pages.

"IEEE 802.11n", Wikipedia, Retrieved on May 10, 2023, Webpage available at : https://en.wikipedia.org/wiki/IEEE_802.11n-2009.

"IEEE 802.11ac", Wikipedia, Retrieved on May 10, 2023, Webpage available at : https://en.wikipedia.org/wiki/IEEE_802.11ac-2013.

"Uplink Multiple access for LTE-Advanced", RAN WG1 Meeting #53bis, R1-082609, Agenda: 12, Nokia Siemens Networks, Jun. 30-Jul. 4, 2008, 11 pages.

"NRU ULCA including wideband operation", 3GPP TSG-RAN WG4 Meeting # 100e, R4-2112304, Agenda: 8.7.2, Skyworks Solutions, Inc, Aug. 19-27, 2021, 6 pages.

"Draft CR to TS38.101-1: Inter-band NR CA Tx requirement including intra-band contiguous CA UL configuration", 3GPP TSG-RAN WG4 Meeting #100e, R4-2114878, ZTE Corporation, Aug. 16-27, 2021, 5 pages.

"CR on contiguous CA with UL MIMO for PC3", 3GPP TSG-RAN WG4 Meeting #100e, R4-2114953, Huawei, Aug. 16-27, 2021, 6 pages.

Office action received for corresponding Finnish Patent Application No. 20225760, dated Jan. 17, 2023, 9 pages.

"3rd Generation Partnership Project; Technical Specification Group Radio Access Network; NR; User Equipment (UE) radio transmission and reception; Part 2: Range 2 Standalone (Release 17)", 3GPP TS 38.101-2, V17.6.0, Jun. 2022, pp. 1-219.

"[103-e-NR-52-71-Waveform-Changes] Discussions Summary #6", 3GPP TSG RAN WG1 Meeting #103-e, R1-2009718, Agenda: 8.2.1, Intel Corporation, Oct. 26-Nov. 13, 2020, pp. 1-205.

\* cited by examiner

UPLINK CARRIER AGGREGATION IN LOW MAXIMUM POWER REDUCTION MODE FOR WIRELESS NETWORKS

RELATED APPLICATIONS

This application claims the benefit of Finland application No. 20225760, filed Aug. 30, 2022, which is incorporated herein by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G and 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency. 6G wireless networks, and other wireless networks, are also being developed, and present many challenges.

SUMMARY

According to an example embodiment, a method may include transmitting, by a user device to a wireless network node, data via a plurality of uplink component carriers including at least a first uplink component carrier and a second uplink component carrier; wherein a first subset of physical resource blocks for the first component carrier is contiguous with a second subset of physical resource blocks for the second component carrier; wherein the first component carrier and the second component carrier have a same power spectral density; and applying a modified radio frequency requirement by the user device wherein the modified radio frequency requirement impacts a transmission power of the first uplink component carrier and of the second uplink component carrier.

According to an example embodiment, an apparatus may include means for transmitting, by a user device to a wireless network node, data via a plurality of uplink component carriers including at least a first uplink component carrier and a second uplink component carrier; wherein a first subset of physical resource blocks for the first component carrier is contiguous with a second subset of physical resource blocks for the second component carrier; wherein the first component carrier and the second component carrier have a same power spectral density; and means for applying a modified radio frequency requirement by the user device wherein the modified radio frequency requirement impacts a transmission power of the first uplink component carrier and of the second uplink component carrier.

An apparatus may include: at least one processor; and at least one memory including computer program code; the at least one memory and the computer program code configured to, with the at least one processor, cause the apparatus at least to: transmit, by a user device to a wireless network node, data via a plurality of uplink component carriers including at least a first uplink component carrier and a second uplink component carrier; wherein a first subset of physical resource blocks for the first component carrier is contiguous with a second subset of physical resource blocks for the second component carrier; wherein the first component carrier and the second component carrier have a same power spectral density; and apply a modified radio frequency requirement by the user device wherein the modified radio frequency requirement impacts a transmission power of the first uplink component carrier and of the second uplink component carrier.

According to an example embodiment, a non-transitory computer-readable storage medium may include instructions stored thereon that, when executed by at least one processor, are configured to cause a computing system to: transmit, by a user device to a wireless network node, data via a plurality of uplink component carriers including at least a first uplink component carrier and a second uplink component carrier; wherein a first subset of physical resource blocks for the first component carrier is contiguous with a second subset of physical resource blocks for the second component carrier; wherein the first component carrier and the second component carrier have a same power spectral density; and apply a modified radio frequency requirement by the user device wherein the modified radio frequency requirement impacts a transmission power of the first uplink component carrier and of the second uplink component carrier.

The details of one or more examples of embodiments are set forth in the accompanying drawings and the description below. Other features will be apparent from the description and drawings, and from the claims.

DETAILED DESCRIPTION

Figure 1:
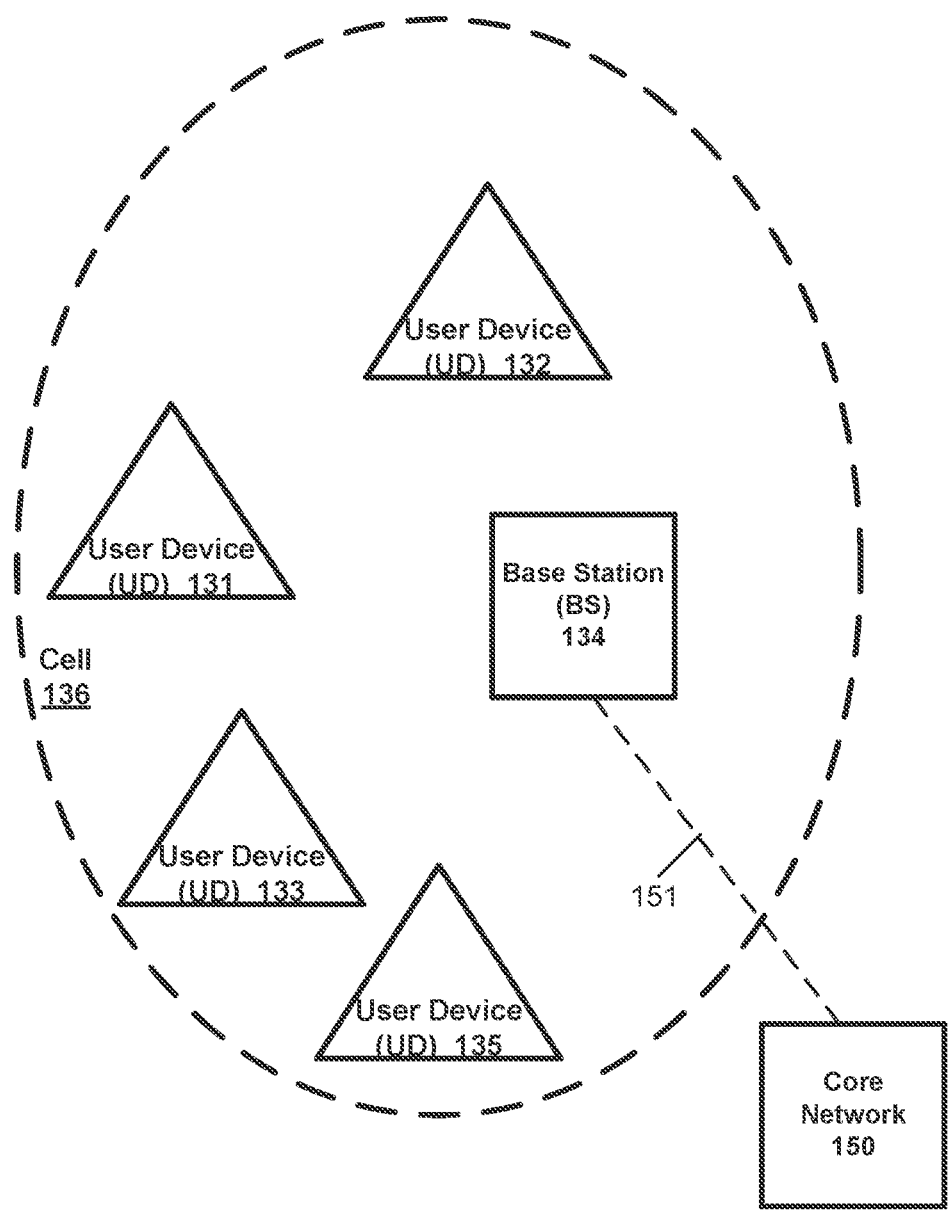
FIG. 1 is a block diagram of a wireless network according to an example embodiment.

FIG. 1 is a block diagram of a wireless network 130 according to an example embodiment. In the wireless network 130 of FIG. 1, user devices (UD) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS or split gNB). At least part of the functionalities of a BS (e.g., access point (AP), base station (BS) or (e)Node B (eNB), gNB, RAN node) may also be carried out by any node, server or host which may be operably coupled to a transceiver, such as a remote radio head. An Integrated Access and Backhaul (IAB) node may also be used or provided, e.g., in which UE functionalities may be performed or carried out by Mobile Termination part of IAB node, and gNB functionalities may be performed by DU part of the IAB node, respectively. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a/centralized unit (CU) and/or a distributed unit (DU) in the case of a split BS or split gNB), or other network node.

According to an illustrative example, a BS node (e.g., BS, eNB, gNB, CU/DU, ...) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, ...) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node or network node (e.g., BS, eNB, gNB, CU/DU, ...) may forward data to the UE that is received from a network or the core network, and/or forward data received from the UE to the network or core network. RAN nodes or network nodes (e.g., BS, eNB, gNB, CU/DU, ...) may perform a wide variety of other wireless functions or services, e.g., such as broadcasting control information (e.g., such as system information or on-demand system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A wireless network node (or a network node) may refer to or include a BS, AP, eNB, gNB, CU, DU, CU/DU, a RAN node, etc.).

A user device or user node (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. Also, a user node may include a user equipment (UE), a user device, a user terminal, a mobile terminal, a mobile station, a mobile node, a subscriber device, a subscriber node, a subscriber terminal, or other user node. For example, a user node may be used for wireless communications with one or more network nodes (e.g., gNB, eNB, BS, AP, CU, DU, CU/DU) and/or with one or more other user nodes, regardless of the technology or radio access technology (RAT). In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, the techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)-related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The techniques described herein may be applied to a wide variety of wireless technologies or wireless networks, such as LTE, LTE-A, 5G (New Radio (NR)), cmWave, and/or mmWave band networks, 6G, IoT, MTC, eMTC, eMBB, URLLC, etc., or any other wireless network or wireless technology. These example networks, technologies or data service types are provided only as illustrative examples.

Transmission bandwidth may be enhanced through the use of carrier aggregation (CA), where multiple component carriers (CCs) are aggregated and jointly used for transmission either to or from a single device. Component carriers do not have to be contiguous in frequency, which enables exploitation of fragmented spectra (use of non-contiguous spectra or frequency resources for multiple component carriers).

Various techniques described herein are directed to and/or consider spectrum utilization and transmit power enhancements of uplink (UL) transmissions in wireless networks (such as for fifth-generation new radio (5G NR), specifically 5G-Advanced, or other wireless networks), including for carrier aggregation (CA) applications. In general, the high peak-to-average power ratio (PAPR) of orthogonal frequency-division multiplexing (OFDM) waveforms is known to be one of the limiting factors for efficient power amplifier (PA) utilization. In order to preserve the waveform quality, e.g., with respect to error vector magnitude (EVM), the PA backoff is introduced, which is realized in 3GPP in terms of Maximum Power Reduction (MPR), which is the maximum allowed reduction of transmit (or transmission) power where the specific RF (radio frequency) requirements have to be fulfilled. However, this directly limits the potential UL coverage (range) and achievable date rates. Additionally, discrete Fourier transform (DFT)-spread OFDM (DFT-s-OFDM) with contiguous spectrum allocation may relax (or reduce) the PAPR and coverage problem compared to CP-OFDM, especially when combined with frequency domain spectrum shaping (FDSS) or other related enhancements. However, the benefits of DFT-s-OFDM and its further variants are dramatically diminished with carrier aggregation (CA) transmission where UE is allocated spectrum from two or more component carriers (CCs). This is partially because of increased PAPR of the CA waveform and partially because of the frequency-localized nature of the PA induced intermodulation, hitting either the adjacent channel leakage ratio (ACLR) limit or inband emission limit, or both. For example, at least in some cases, the ACLR of a RF device, such as a mixer, amplifier, isolator, or other device, may be dominated by the 3rd-order intermodulation distortion (IM3) or $3^{rd}$ order intermodulation products of the device.

Techniques and embodiments are described herein for uplink CA transmission wherein a wideband uplink carrier may include multiple component carriers, which may result in a wideband single-carrier-like spectrum or transmission of a single carrier waveform, and which may result in (or may allow) increased transmission power and/or lower MPR while still meeting signal quality requirements and/or emission requirements.

Many (e.g., current and/or likely future) applications may require much higher uplink bandwidth or higher peak data rates. For example, the use and/or importance of larger uplink peak data rates may be useful or even required for various industrial Internet applications, and also in future metaverse systems, both of which may rely on immersive camera technologies and corresponding real-time camera feeds towards the network (e.g., which may, thus, require significant UL bandwidth or data rates). While some examples described herein are provided for UL CA using DFT (Discrete Fourier Transform) and/or DFT-s-OFDM, proposed techniques, embodiments and/or approaches are also applicable to other technologies or techniques such as CP-OFDM (cyclic prefix-OFDM) where current CA technology also imposes or requires clear transmit power reduction (or maximum power reduction, MPR) compared to a single component carrier (CC) transmission.

Figure 2:
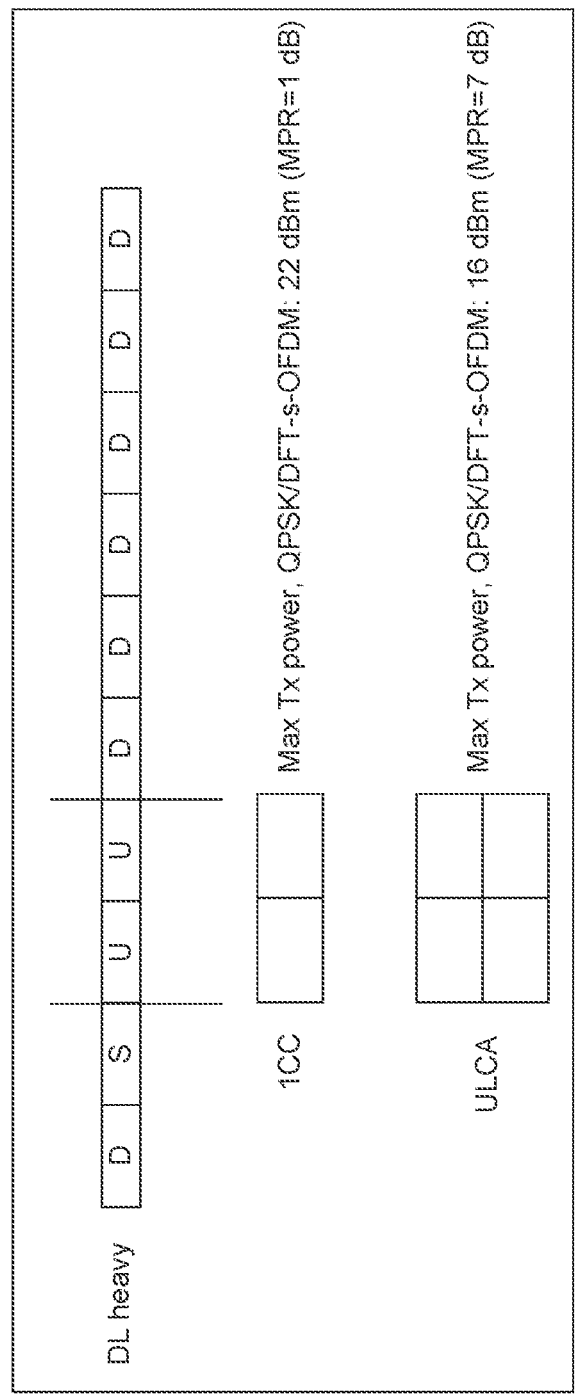
FIG. 2 is a diagram illustrating an example maximum power reduction for one component carrier (1CC) as compared to an example maximum power reduction for carrier aggregation that includes two component carriers (UL CA).

UL CA may typically require a much higher MPR (and, thus, typically require a lower transmit/transmission power) than a single component carrier transmission. FIG. 2 is a diagram illustrating example maximum power reduction for one component carrier (1CC) as compared to an example maximum power reduction for carrier aggregation that includes two component carriers (UL CA).

Maximum power reduction corresponds to a minimum requirement for a maximum transmit (or transmission) power. For example, a single carrier transmission (e.g., such as a single carrier transmission of a 3GPP defined power class 3 (PC3) device) that uses one component carrier (1CC) may have a maximum transmission power of 22 dBm, with a MPR=1 dB, whereas UL CA transmission that uses two CCs may have a maximum transmission power (or more accurately a minimum requirement for a maximum transmission power) of only 16 dBm, with a MPR of 7 dB. Thus, the UL CA transmission may typically require or use a much higher MPR, resulting a significantly lower transmission power for CA, as compared to single carrier or single CC transmission, which will limit range of the transmitted signals. This is an illustrative example of possible differences in MPR for single CC (1CC) transmission and CA transmission that includes two CCs (UL CA). Thus, the requirement for a higher MPR for CA may limit or reduce coverage or range of signals transmitted via UL CA, and may also restrict or limit use of high (or higher) modulation orders (or higher modulation schemes) at larger link distances or ranges.

Thus, for example, as shown in FIG. 2, a significant back-off (large MPR) may be needed to fulfil various RF (radio frequency) signal quality requirements, such requirements related to one or more of EVM (error vector magnitude), OCB (occupied channel bandwidth), IBE (inband emission), and/or ACLR (adjacent channel leakage ratio) and/or out-of-band emission requirements with currently standardized UL CA concepts. Also, for example, when IMD products fall in the edge or adjacent channels the spurious emission mask and the ACLR are the main limiting factors and it will require larger MPR. Therefore, in order to take advantage of larger transmission bandwidths with carrier aggregation and high transmit power, it will be advantageous to avoid intermodulation products falling in adjacent channels.

For example, if there are 2 CCs (e.g., two channels) transmitted as part of UL CA, intermodulation distortion (IMD) products will typically be generated, and these IMD products may fall either within the two channels, or outside of the two channels, and transmission (or transmit) power may typically need to be reduced (higher MPR) to meet interference requirements, since power of IMD products is based on overall transmit power. For example, IMD products that fall outside of these two channels/CCs may interfere with other UEs or other CCs. With typical current CCs, the frequency allocation is not contiguous for both channels/CCs, thus IMD products may typically fall or be present outside of the channels. Also, a guard band between the two CCs (or between the two channels) may prevent contiguous allocation of PRBs/frequency allocation. As a result, the transmitted signal for the UL CA (with two CCs) may be a multi-carrier waveform with higher PAPR, and thus, may require lower transmission power (higher MPR) to meet signal requirements (as compared to a single CC transmission). Also, with two CCs (two channels) for UL CA, the CCs or two carriers may (at least in some cases) be independently scheduled, may have different modulation and coding schemes (MCSs, which may include modulation scheme and/or coding rate), may have different power spectral density, and/or may use separate DFT processes (or separate DFT-S-OFDM processes) for each of the CCs, for example.

Therefore, techniques are described to allow transmission of multiple uplink component carriers (CCs) (e.g., including at least a first component carrier (CC) and a second CC). A first subset of physical resource blocks (PRBs) for the first CC is contiguous with a second subset of PRBs for the second CC. The first CC and the second CC may have a same power spectral density. Also, a modified radio frequency (RF) requirement may be applied by a UE that impacts a transmit (or transmission) power of the first and second UL CCs.

Figure 3:
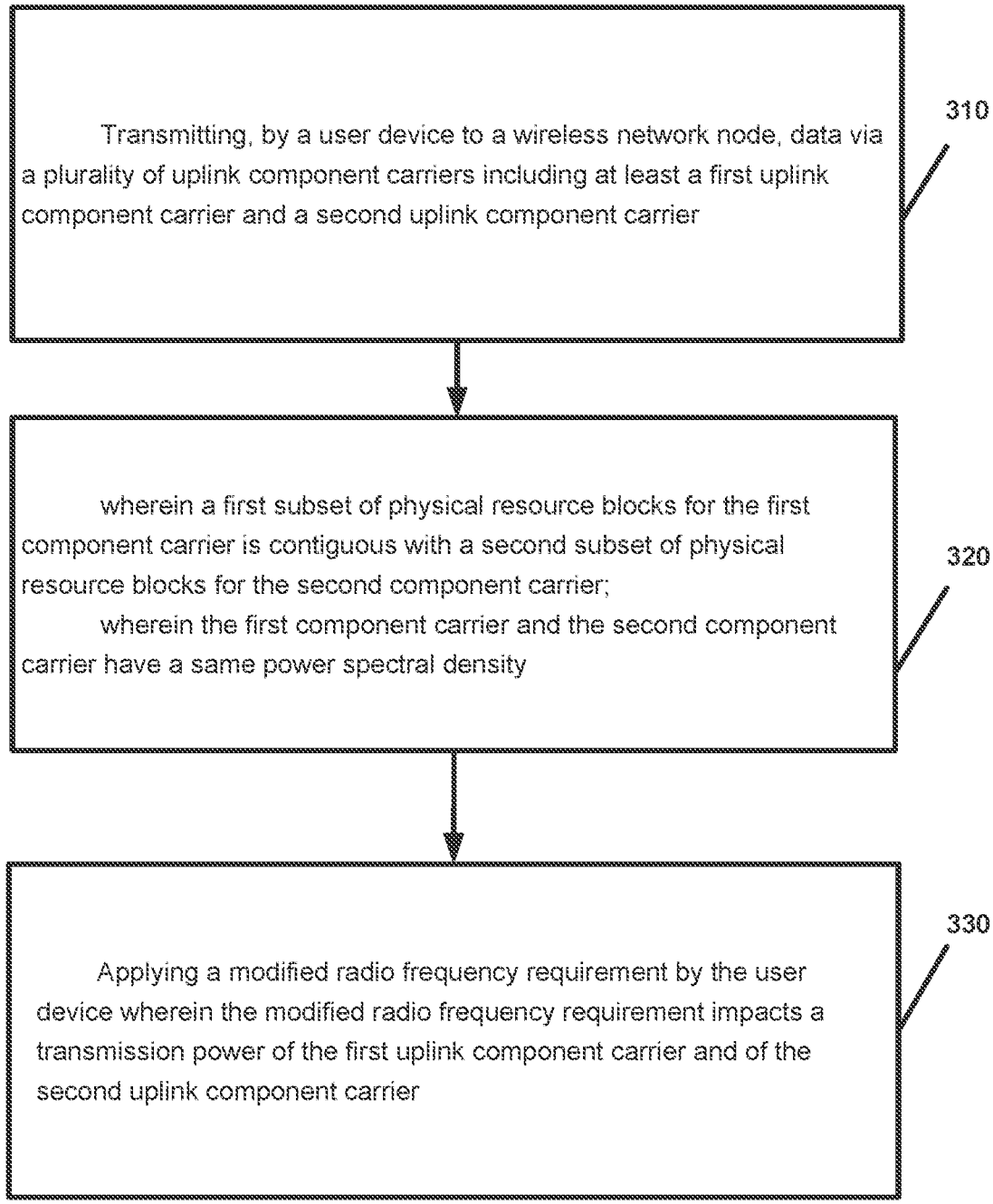
FIG. 3 is a flow chart illustrating operation of a user device or UE according to an example embodiment.

FIG. 3 is a flow chart illustrating operation of a user device or UE according to an example embodiment. Operation 310 includes transmitting, by a user device to a wireless network node, data via a plurality of uplink component carriers including at least a first uplink component carrier and a second uplink component carrier. Operation 320 indicates that a first subset of physical resource blocks for the first component carrier is contiguous with a second subset of physical resource blocks for the second component carrier; wherein the first component carrier and the second component carrier have a same power spectral density. Operation 330 includes applying a modified radio frequency requirement by the user device wherein the modified radio frequency requirement impacts a transmission power of the first uplink component carrier and of the second uplink component carrier.

According to an example embodiment of the method of FIG. 3, the applying a modified radio frequency requirement may include at least one of the following: applying, by the user device, a lower maximum power reduction, or a higher possible transmission power, based on the plurality of component carriers having contiguous subsets of physical resource blocks and the plurality of component carriers having a same power spectral density, as compared to where the plurality of component carriers have non-contiguous subsets of physical resource blocks and/or have different power spectral densities; and/or transmitting, by the user device, a waveform having a lower peak to average power ratio (PAPR) based on the plurality of component carriers having contiguous subsets of physical resource blocks and the plurality of component carriers having a same power spectral density, as compared to where the plurality of component carriers have non-contiguous subsets of physical resource blocks and/or have different power spectral densities.

According to an example embodiment of the method of FIG. 3, the plurality of uplink component carriers, including at least a first uplink component carrier and a second uplink component carrier, may be provided within a wideband uplink carrier, wherein the wideband uplink carrier includes a common set of physical resource blocks, and wherein the physical resource blocks of the wideband uplink carrier have physical resource block alignment with both the first subset of physical resource blocks for the first component carrier and the second subset of physical resource blocks for the second component carrier.

According to an example embodiment of the method of FIG. 3, there is a physical resource block alignment of the physical resource blocks of the wideband uplink carrier with the physical resource blocks of the first subset of physical resource blocks for the first component carrier and the second subset of physical resource blocks for the second component carrier. For example, physical resource block alignment may include at least one of the following: the physical resource blocks of the common set of physical resource blocks, the first subset of physical resource blocks for the first component carrier, and the second subset of physical resource blocks for the second component carrier are provided within or as part of a common grid of physical resource blocks; and/or a starting position of each physical resource block of the common set of physical resource blocks, the first subset of physical resource blocks for the first component carrier, and the second subset of physical resource blocks for the second component carrier are provided at an integer multiple of N subcarriers, where N is also an integer.

According to an example embodiment of the method of FIG. 3, the method may further include using a same modulation scheme to modulate data for the plurality of component carriers; and applying a single Discrete Fourier Transform (DFT) process to modulated symbols of the plurality of component carriers to generate a single carrier waveform that has a lower maximum power reduction, or a higher transmission power, as compared to using different modulation schemes to modulate data for the plurality of component carriers and/or applying different Discrete Fourier Transform (DFT) processes to the modulated symbols of the plurality of component carriers.

According to an example embodiment of the method of FIG. 3, the plurality of uplink component carriers, including at least the first uplink component carrier and the second uplink component carrier, are provided within a wideband uplink carrier; and wherein the wideband uplink carrier includes physical resource block alignment with the plurality of uplink component carriers.

According to an example embodiment of the method of FIG. 3, the method may further include applying a (e.g., single) cyclic prefix-Orthogonal Frequency Division Multiplexing (CP-OFDM) process to modulated symbols of the plurality of component carriers to generate a single carrier waveform that has a lower maximum power reduction, or a higher transmission power, as compared to where the plurality of component carriers have non-contiguous subsets of physical resource blocks and/or have different power spectral densities and/or do not use or apply a CP-OFDM process to modulated symbols of the plurality of component carriers.

According to an example embodiment of the method of FIG. 3, the first uplink component carrier and the second uplink component carrier are transmitted as a single carrier waveform by applying a single Discrete Fourier Transform (DFT) process or a single Discrete Fourier Transform-Spread-Orthogonal Frequency Division Multiplexing (DFT-S-OFDM) process both to modulated symbols of a first transport block of the first uplink component carrier and to modulated symbols of a second transport block of the second uplink component carrier.

According to an example embodiment of the method of FIG. 3, the applying a modified radio frequency requirement by the user device may include: applying, by the user device, a lower maximum power reduction, or a higher possible transmission power, based on first uplink component carrier and the second uplink component carrier being transmitted as a single carrier waveform by the applying a single Discrete Fourier Transform (DFT) process or a single Discrete Fourier Transform-Spread-Orthogonal Frequency Division Multiplexing (DFT-S-OFDM) process.

According to an example embodiment of the method of FIG. 3, a common modulation scheme may be used for the plurality of component carriers, including both the first uplink component carrier and the second uplink component carrier.

According to an example embodiment of the method of FIG. 3, a first hybrid ARQ (HARQ) process is provided for the first uplink component carrier to enable the user device to receive acknowledgements and/or negative acknowledgements for data transmitted by the user device via the first uplink component carrier; and a second hybrid ARQ (HARQ) process, separate from the first HARQ process, is provided for the second uplink component carrier to enable the user device to receive acknowledgements and/or negative acknowledgements for data transmitted by the user device via the second uplink component carrier.

According to an example embodiment of the method of FIG. 3, a first hybrid ARQ (HARQ) process-specific new data indicator (NDI) is provided for the first uplink component carrier to enable the user device to receive scheduling for new data transmission and/or for retransmission of data transmitted by the user device via the first uplink component carrier; and a second hybrid ARQ (HARQ) process-specific new data indicator (NDI), separate from the first HARQ process, is provided for the second uplink component carrier to enable the user device to receive scheduling for new data transmission and/or for retransmission of data transmitted by the user device via the second uplink component carrier.

According to an example embodiment of the method of FIG. 3, modulated symbols of the first uplink component carrier are provided in a first transport block, and modulated symbols of the second uplink component carrier are provided in a second transport block.

According to an example embodiment of the method of FIG. 3, a single Discrete Fourier Transform-Spread-Orthogonal Frequency Division Multiplexing (DFT-S-OFDM) process is applied both to modulated symbols of the first transport block of the first uplink component carrier and to modulated symbols of the second transport block of the second uplink component carrier; and at least one of the following is performed: the modulated symbols of the first transport block are multiplexed in time with modulated symbols of the second transport block, within a symbol; or multiplexing of the transport blocks is performed by the modulated symbols of the first transport block are provided on a first set of consecutive symbols, and the modulated symbols of the second transport block are provided on a second set of consecutive symbols that occurs after the first set of consecutive symbols.

According to an example embodiment of the method of FIG. 3, a separate physical uplink control channel (PUCCH) is provided for one of (or, alternatively, for each of) the first uplink component carrier and the second uplink component carrier.

According to an example embodiment of the method of FIG. 3, uplink control information is multiplexed with modulated symbols of one of the first uplink component carrier or the second uplink component carrier.

According to an example embodiment of the method of FIG. 3, a joint (e.g., provided for both UL CCs) demodulation reference signal is transmitted by the user device for both the first uplink component carrier and the second uplink component carrier, and wherein the joint demodulation reference signal is defined according to a total allocation size or is defined to cover allocated physical resource blocks (PRBs) of both the first uplink component carrier and the second uplink component carrier.

According to an example embodiment of the method of FIG. 3, the plurality of uplink component carriers, including at least the first uplink component carrier and the second uplink component carrier, are provided within a wideband uplink carrier; and wherein at least one of the following is performed: providing a first sounding reference signal for the first uplink component carrier, and providing a second sounding reference signal for the second uplink component carrier; or providing a combined or joint (for both CCs or all CCs of the wideband UL carrier) sounding reference signal for the wideband uplink carrier.

According to an example embodiment of the method of FIG. 3, the method may further include: using a same modulation scheme (and/or same modulation and coding scheme MCS) to modulate data for the first uplink component carrier and the second uplink component carrier; wherein the first uplink component carrier and the second uplink component carrier are provided within a wideband uplink carrier, wherein the wideband uplink carrier includes a common set of physical resource blocks including the first subset of physical resource blocks and the second subset of physical resource blocks; applying at least one of 1) a single Discrete Fourier Transform (DFT) process or 2) a single Discrete Fourier Transform-Spread-Orthogonal Frequency Division Multiplexing (DFT-S-OFDM) process to modulated symbols of the wideband uplink carrier including modulated symbols of both the first uplink component carrier and the second uplink component carrier; and transmitting a single carrier waveform based on an output of the single DFT process or an output of the single DFT-S-OFDM process and/or a single CP-OFDM process applied to modulated symbols of the wideband uplink carrier (e.g., including being applied to modulated symbols of the first and second component carriers).

Further illustrative details and examples are described hereinbelow.

According to an illustrative example embodiment, an aggregated BW may be used or provided, which may cover (or may include) more than 275 physical resource blocks (PRBs), which may be an upper limit of PRBs or frequency resources per carrier, where a PRB (or which may simply be referred to as a resource block or RB) may include a fixed integer number of subcarriers (e.g., N=12 subcarriers per PRB). Thus, an aggregated BW may include PRBs for multiple CCs (e.g., more than 275 PRBs). Also, the term resource block (RB) or physical resource block (PRB) may generally refer to or include time-frequency resources, e.g., both subcarriers and time domain resources such as one or more OFDM (orthogonal frequency division multiplexing) symbol(s).

Figure 4:
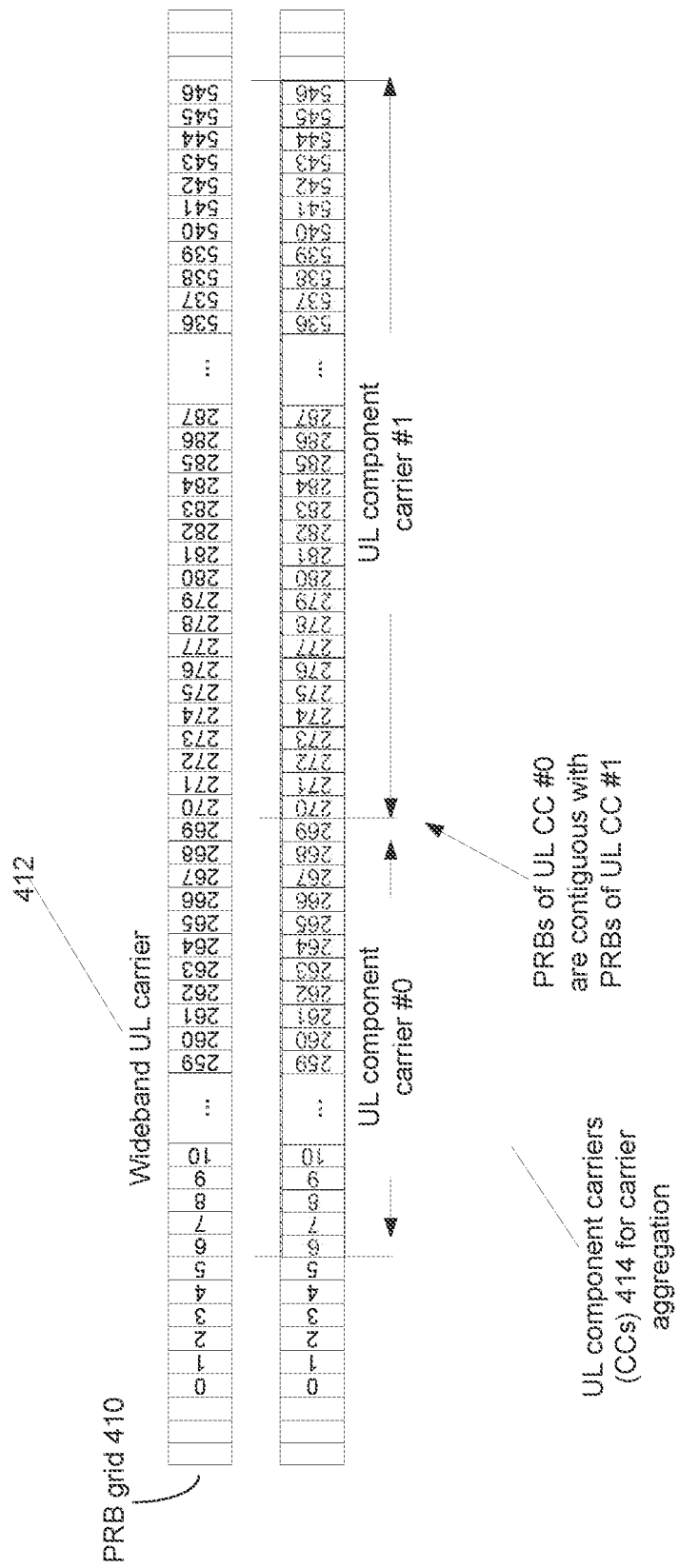
FIG. 4 is a diagram of two uplink component carriers according to an example embodiment.

FIG. 4 is a diagram of two uplink component carriers according to an example embodiment. As shown in FIG. 4, a wideband (e.g., having a bandwidth or number of PRBs that spans or encompasses multiple carriers or multiple component carriers) UL carrier 412 includes physical resource blocks (PRBs) on a PRB grid 410, e.g., where each PRB may include N (e.g., N=12) subcarriers. For example, this could be seen as an example of SCS-SpecificCarrier defined for 200 MHz scenario. In the example shown in FIG. 4, wideband UL carrier 412 includes 547 PRBs (PRB 0 to PRB 546), but other number of PRBs may be provided within the wideband UL carrier 412. The PRB grid 410 may define a width of each PRB (e.g., 12 subcarriers, and/or a start of each PRB is an integer number of the N (e.g., N=12 subcarriers from an initial starting point, e.g., PRB 0 starts at the beginning, PRB 1 starts at 12 subcarriers from the starting point, PRB 2 starts at 24 subcarriers from the starting point of the PRB grid, etc.

A plurality of UL component carriers (UL CCs) may be provided and may include a first UL component carrier (e.g., UL CC #0) and a second UL component carrier (e.g., UL CC #1). The UL CC #0 and UL CC #1 may be provided within (e.g., within a bandwidth or PRBs of) the wideband UL carrier 412.

For example, wideband UL carrier 412 includes a common set of PRBs (e.g., common, since these PRBs of the wideband UL carrier 412 may be used for multiple UL CCs, applied to multiple UL CCs, and/or may include PRBs of multiple UL CCs). UL CC #0 may include a first subset (such as a first subset of PRBs of the common set of PRBs) of PRBs (e.g., UL CC #0 may include PRBs #6-269 of the common set of PRBs of the wideband UL carrier 412) and UL CC #1 may include a second subset of PRBs (e.g., UL CC #1 may include PRBs #270-546 of the common set of PRBs of the wideband UL carrier 412), for example. Also, for example, the sizes of UL component carrier #0, and UL component carrier #1 may vary as well as the subset sizes on UL component carrier #0, and UL component carrier #1 may vary according to gNB scheduling, while FIG. 4 illustrates just one example scheduling. The total allocation (e.g., allocation of frequency resources or PRBs) size may vary. The borderline (or boundary or border) between UL CC #0 and UL CC #1 may vary. Depending on the scenario, there may be only one UL CC scheduled at certain time.

Also, for example, there may be a PRB alignment of the PRBs of the wideband UL carrier 412 with both PRBs of the first subset of PRBs for UL CC #0 and PRBs of the second subset of PRBs for UL CC #1. For example, PRB alignment may refer to or may include at least one of the following: the PRBs of the common set of PRBs, the first subset of PRBs for the first component carrier (e.g., UL CC #0), and the second subset of PRBs for the second component carrier (e.g., UL CC #1) are provided within or as part of a common grid of PRBs (e.g., see PRB grid 410, as an example of a common grid of PRBs that are used for the wideband UL carrier, UL CC #0, and UL CC #1, e.g., where PRBs 6-269 are provided for both UL CC #0 and wideband UL carrier 412, and PRBs 270-546 are provided for both UL CC #1 and wideband UL carrier 412); and/or a starting position of each PRB of the common set of PRBs, a starting position of the first subset of PRBs for the first component carrier (e.g., for UL CC #0), and a starting position of the second subset of PRBs for the second component carrier (UL CC #1) are provided at an integer multiple of N subcarriers, where N is also an integer. For example, a first PRB is provided starting at subcarrier #0, a second (or next) PRB is provided at subcarrier #12, a third (or next) PRB is provided at subcarrier #24, etc., since the width of each of the PRBs is 12 subcarriers, in this illustrative examples, for PRBs of the UL wideband carrier; Also, both UL CCs, and/or the starting points of PRBs are aligned or at the same point or frequency boundary (or the subcarrier boundary between successive or adjacent PRBs) is the same for wideband UL carrier 412 and the UL CCs.

In addition, one or more requirements and/or restrictions may be applied in order to generate a single carrier waveform based on a wideband UL carrier 412 that may include multiple UL CCs (e.g., such as UL CC #0 and UL CC #1), which may impact a transmit (or transmission) power of the first UL CC (e.g., UL CC #0) and the second UL CC (e.g., UL CC #1), e.g., allowing the UL CCs to use a lower MPR and/or a higher transmit (or transmission) power, allowing for greater signal range in the case where multiple CCs are used (e.g., for carrier aggregation).

The PRBs of the first subset of PRBs for the first UL CC (e.g., for UL CC #0) may be contiguous with the second subset of PRBs for the second UL CC (e.g., for UL CC #1). For example, UL CC #0 ends at PRB 269, and UL CC #1 begins at PRB 270, hence the PRBs of UL CC #0 and UL CC #1 are contiguous in this example. Transmitting multiple CCs that have contiguous PRBs allows the multiple CCs to also be transmitted via a single carrier waveform, e.g., which may be transmitted based on, e.g., using: One or more of the following (e.g., radio frequency or RF) requirements and/or restrictions may be applied or used for transmission of multiple component carriers (CCs).

Both UL CCs (or multiple UL CCs) may be transmitted with a same power spectral density. For example, a single power control process may be applied for both UL CCs, or used by the UE to control the transmit power and/or power spectral density of both UL CCs, so that the power spectral density will be the same for both UL CCs.

Also, the UE may apply a modified radio frequency (RF) requirement that may impact a transmit power (or transmission power) of the multiple UL CCs (e.g., impacts a transmit power of the UL CC #0 and UL CC #1). The modified RF requirement may include one or more of: 1) applying, by the UE, a lower maximum power reduction (MPR), or a higher possible transmit power or transmission power, based on the plurality of component carriers (UL CCs) having contiguous subsets of physical resource blocks and the plurality of component carriers having a same power spectral density, as compared to where the plurality of component carriers have non-contiguous subsets of physical resource blocks and/or have different power spectral densities; and 2) transmitting, by the user device, a waveform having a lower peak to average power ratio (PAPR) based on the plurality of component carriers having contiguous subsets of physical resource blocks and the plurality of component carriers having a same power spectral density, as compared to where the plurality of component carriers have non-contiguous subsets of physical resource blocks and/or have different power spectral densities.

The UE may also apply other requirements or features, such as, for example: 1) A single DFT process may be used by the UE transmitter for both UL CCs, (or alternatively, a single DFT-S-OFDM process or a single CP-OFDM process may be used for both UL CCs). For example, based on the contiguous PRBs of the two UL CCs, a single (wider) DFT process (or a single wider DFT-S-OFDM process or CP-OFDM process) may be used for both UL CCs; and 2) a same modulation scheme (or a same modulation and coding scheme (MCS) may be used for (or applied to) both UL CCs.

In this manner, via use of one or more of restrictions, such as one or more of the following: 1) UL CCs include contiguous PRBs, and 2) using a same power spectral density for both UL CCs, and possibly further 3) using or based on a single DFT process (or using or based on a single DFT-S-ODFM process or a single CP-OFDM process) for both UL CCs, and/or 4) using a same modulation scheme (or a same modulation and coding scheme (MCS)) for both UL CCs, a single carrier waveform may be transmitted that provides low peak-to-average power ratio (PAPR) benefits, and also allows low single-carrier like low MPR value(s) to be used, thereby allowing higher transmit (or transmission) power to be used for transmitting the multiple CCs. In this manner, the reach or range of a signal that employs carrier aggregation (multiple UL CCs) may be extended, e.g., because of the single carrier waveform qualities, a lower MPR value may be used) as compared to a multi-carrier signal that may typically be required to use higher MPR values (e.g., FIG. 2, indicating that higher MPR values are required for transmitting multi-carrier signal (e.g., with multiple CCs, which may be non-contiguous), as compared to lower MPR values may be used for transmitting a single carrier signal that includes 1 CC).

In an example embodiment, the wideband (WB) UL carrier (e.g., and WB UL bandwidth part (WB UL BWP)) may include, for example, two UL CCs, such as UL CC #0 and UL CC #1. One or more capabilities or functions of the UL CCs may be limited or restricted, e.g., so as to maintain or provide a low-PAPR (or relatively low-PAPR) property and, e.g., to avoid IMD (inter-modulation distortion) power localizing to certain parts of the spectrum in a non-beneficial way. As noted, the one or more restrictions may include: the UL CCs create a contiguous PRB allocation; the UL CCs have the same power spectral density; the UL CCs may have the same modulation order (or MCS) and may have a same duration in symbols. Also, in an embodiment for DFT-s-OFDM, the possible PRBs sizes of two (or more) UL Carriers may (or may be required to) follow the DFT size rule defined for LTE and NR (i.e., products of the integers 2, 3, and 5). For example, in order to allow for an efficient DFT implementation based on FFT, the set of values of DFT sizes may be limited by the specifications to be of the form: DFT_size=$2^{(a2)}*3^{(a3)}*5^{(a5)}$, where a2, a3 and a5 are integers greater or equal to 0. Example: 6 RBs is a valid allocation size since 6*12=72=3*3*2*2*2; But 7 RBs is not (in this example) a valid allocation size: 7*12=84=7*2*2*3, as examples.

When one or more of these capabilities or functions of the UL CCs is restricted in this manner (or when one or more allowed subsets of these capabilities or functions is restricted or provided in this manner, e.g., all 4 of these are restricted, or 3 of the 4 are restricted in this manner), the UE may use or follow MPR (and possibly other RF requirements such as IBE, OCB, ACLR) defined for the wideband UL carrier (& WB UL BWP), and thus, may use the lower MPR value indicated for 1 CC transmission (e.g., see FIG. 2). Otherwise, when the rules or required restrictions are not fulfilled for transmission that includes multiple CCs, the UE can operate according to the (current) UL CA framework, e.g., the UE may use the higher MPR indicated for 2 or more UL CCs (e.g., see FIG. 2, as an example).

Thus, for example, a single carrier waveform (or a single-carrier-like waveform, e.g., a carrier waveform that has one or more properties of a single-carrier waveform, thereby providing low (or lower) PAPR benefits like a 1 CC transmission or waveform and allowing the lower/1 CC MPR values to be used) may be generated and/or transmitted based on multiple UL CCs, using one or more of the above features or restrictions (e.g., such as UL CCs with contiguous PRBs, a same power spectral density for both UL CCs, a single DFT process may be used for both UL CCs, and/or a same modulation scheme may be used for both UL CCs), a number of features or functions may be provided separately for each of the UL CCs, including one or more of the following:

Allocation of PRBs and/or UL scheduling of transmissions via the two CCs (e.g., for UL CC #0 and UL CC #1) may be allocated and/or scheduled separately. For example, a wireless network node (e.g., gNB) may separately allocate resources (e.g., PRBs) and schedule UL transmissions (e.g., provide UL grants to the UE) separately for each of the UL CCs provided as part of UL carrier aggregation (UL CA), e.g., UL CC #and UL CC #1. For example, UE may receive a separate DCI (downlink control information), e.g., with each DCI (or DCI for each UL CC) may indicate UL scheduling or UL grants for each of the UL CCs. Alternatively, multiple UL CCs (as part of the UL CA) may have a combined DCI, where one DCI may be used to indicate UL scheduling or indicate UL grants for multiple UL CCs.

Each of the UL CCs (e.g., UL CC #0 and UL CC #1) may have a different number of PRBs.

Each UL CC may have its own transport block (TB), and each of these TBs may have its own or a different TB size. Thus, a different transport block size may be used for each of the UL CCs (e.g., for each of UL CC #0 and UL CC #1). The transport blocks of these UL CCs may be spread over the combined frequency allocation of (at least a portion of) the wideband UL carrier. This may result in a carrier waveform with lower PAPR properties, and may allow or provide a waveform with single carrier (or single-carrier like) properties and allows a lower (e.g., 1 CC MPR values) MPR values to be used. When the transport blocks are spread over the combined frequency allocation, the transport blocks are multiplexed in time. For example in the case of DFT-S-OFDM, the time multiplexing of multiple transport blocks may be done within each DFT-S-OFDM symbol. Alternatively, the time multiplexing of multiple transport blocks may be done across multiple DFT-S-OFDM symbols so that the transport block of, for example, UL CC #0 occupies first DFT-S-OFDM symbols and a time portion of a DFT-S-OFDM symbol, and the transport block of, for example, UL CC #1 occupies the remaining time portion of the DFT-S-OFDM symbol and following DFT-S-OFDM symbols.

Each of the UL CCs (e.g., UL CC #0 and UL CC #1) may include its own Hybrid Automatic Repeat ReQuest) (HARQ) process, e.g., with a different HARQ process Identifier. Alternatively, multiple UL CCs may use a combined HARQ process for both or multiple UL CCs. This may mean that UL CCs would have their own transport blocks, encoded separately Thus, for example, if one or more of the above-noted restrictions are met (e.g., contiguous PRBs for the UL CCs, same power spectral density for the UL CCs, both UL CCs use a single DFT process, and/or a same power spectral density is used for both UL CCs), then a lower MPR can be used for transmission of the waveform for the multiple UL CCs, as the transmitted waveform appears or is presented/ transmitted as a single carrier waveform, but the transmitted signal may have some functionality, capabilities and/or flexibility of two UL CCs, e.g., the UL CCs may have different (or their own) scheduling, different HARQ processes, different sized TBs, different physical uplink control channels, etc.

FIG. 4 illustrates a scheduling example. For example, UL CC #0 can be scheduled via DL CC #0, and UL CC #1 can be scheduled via DL CC #1, respectively. Only UL CCs are shown.

With reference to the UL CCs shown in FIG. 4, UL CCs may each have their own HARQ processes (similarly as in UL CA). This means, for example, that each UL CC may have their own transport blocks, encoded separately. In case of DFT-S-OFDM, the TBs (transport blocks) would be multiplexed in time, e.g., within each symbol. Alternatively, the TB for the UL CC #0 is multiplexed on first consecutive symbols, followed by the TB for the UL CC #1 (also other multiplexing options exist).

PUCCH (Physical UL control channel): Both UL CCs (e.g., UL CC #0 and UL CC #1) may each have their own PUCCH. The PUCCH may follow (or may come after) that of UL CC #0, UL CC #1. According to this embodiment, there is no need for PUCCH on the wideband UL carrier 412.

UCI (Uplink control information) on PUSCH (Physical uplink shared channel): UCI can be multiplexed with the modulation symbols of one UL CC according to legacy rules. The UL CC for UCI (uplink control information) may be selected based on serving cell index of the corresponding UL CC but using properties of PUSCH allocation (duration type) on the wideband UL carrier 412.

DMRS (demodulation reference signal): Joint DMRS may be defined for two UL CCs (e.g., one DMRS signal may be provided or transmitted for both UL CC #0 and UL CC #1) according to total allocation size. This may ensure that low PAPR properties are provided not only for PUSCH data, but also DMRS.

SRS (sounding reference signal): Option 1: Each of the UL CCs may have (or may transmit) their own SRS. In this embodiment, SRS is not transmitted simultaneously from two component carriers (otherwise, there may typically be PAPR increase). Option 2: Define SRS covering the whole Wideband UL carrier/BWP. Thus, in option two, there would be one SRS transmitted for the wideband UL carrier 412 (thus, one SRS may be transmitted by the UE for all UL CCs within the wideband UL carrier 412).

Downlink control signaling may also be optimized for the proposed scenario. For example, it's possible to define an UL grant which covers both (more than one) UL CCs. In this scenario: a MCS (modulation scheme or modulation and coding scheme) may be common for all (e.g., both) of the UL CCs, e.g., UL CC #0 and UL CC #1.

PRB allocation may be optimized for this scenario (PRB start for the 2nd UL component carrier is the same as (PRB end+1) for the 1st UL component carrier.)

UL grant may include separate HARQ information fields for both UL CCs. For example, a single UL grant may cover more than one UL CC. In this scenario, carrier specific Information elements may be used or provided for certain HARQ-related aspects, such as HARQ process number, New data indicator, Redundancy number, as examples. When PRB allocation is confined within the PRBs of a single UL CC, only first HARQ information fields are valid, and no TDM of multiple TBs is performed.

A single UL grant (e.g., for both UL CCs) may reduce throughput loss due to failed PDCCH (physical downlink control channel, which includes DCI) detection in case of DFT-S-OFDM. If separate UL grants would be used for the UL CCs, UE failing to decode either of UL grants may typically cause detection failure for both TBs due to DFT sizes misaligned between UE and gNB.

UE's FFT (Fast Fourier Transform) size: Starting point: FFT size is an implementation issue (e.g., in some cases in may be assumed that a maximum FFT size may be 4K FFT/CC (or per component carrier), for example assuming (max) 4 k FFT/carrier). In most of the scenarios, the current 4 k FFT/carrier is not enough to support up-to 200 MHz contiguous PRB allocations. Obviously one implementation option would be to support 8 k FFT in these cases. On the other hand, it can be shown that 8 k FFT can be supported also by leveraging the current FFTs available in the UL CA-capable UE (the assumption is that there are 4 k FFTs available for both UL CCs). However, this may involve some extra UE signal processing (compared to current UL CA).

Figure 5:
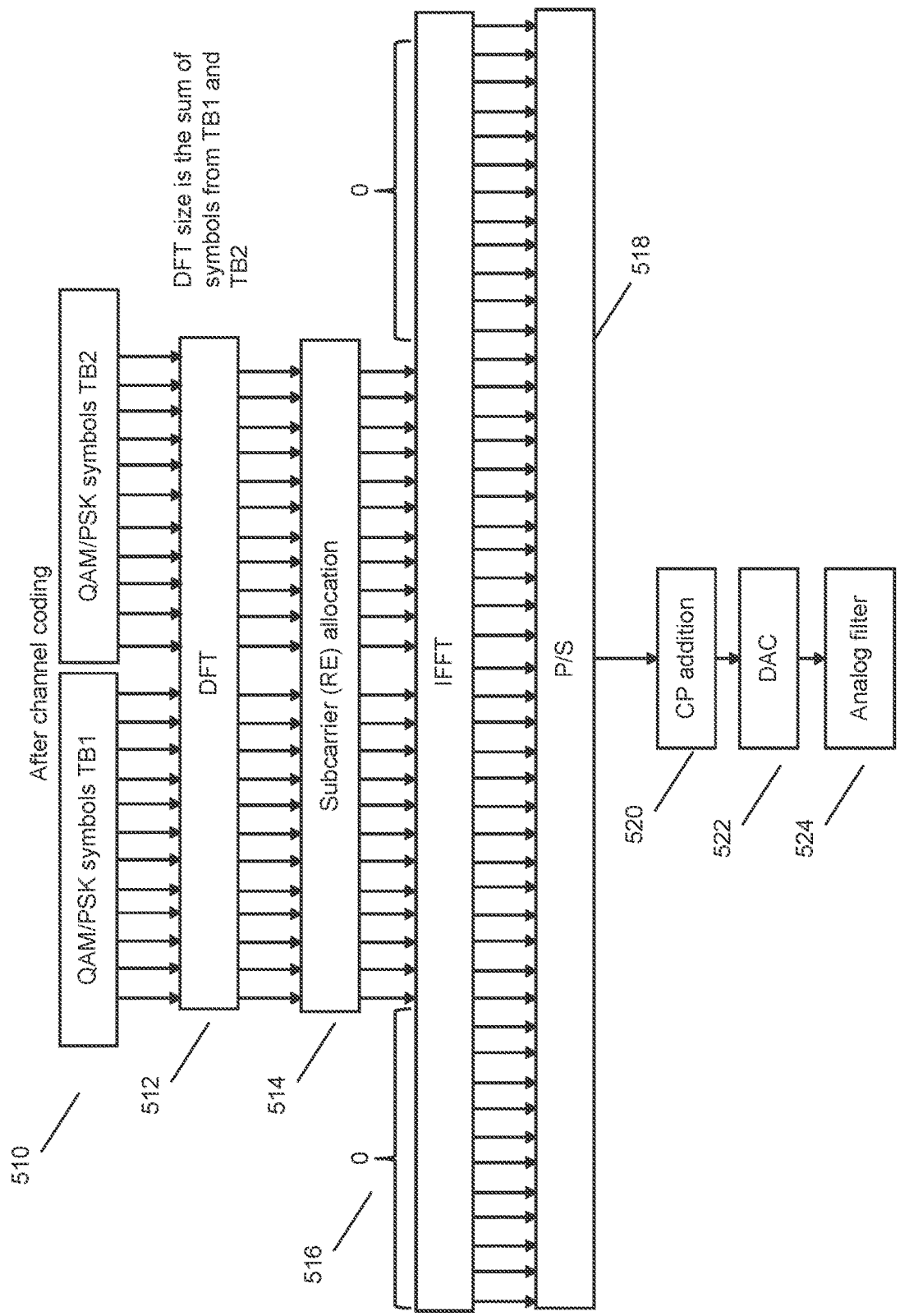
FIG. 5 is a diagram illustrating a transmitter according to an example embodiment.

FIG. 5 is a diagram illustrating a transmitter according to an example embodiment. A UE and a wireless network node (e.g., a gNB) may include a wireless transceiver, which may include a transmitter and a receiver. At 510, channel coding may be performed on received data for UL CC #0 to obtain symbols (e.g., quadrature amplitude modulation (QAM) or phase shift keying (PSK) symbols for transport block 1 (TB1), and channel coding may be performed on data for UL CC #1 to obtain QAM or PSK symbols for transport block 2 (TB2). At 512, a discrete Fourier Transform (DFT) process may be performed on symbols of both TB1 for UL CC #0 and TB2 for UL CC #2 (one DFT process 512 is performed for the symbols of transport blocks of multiple UL CCs). The size of DFT process 512 may include a sum of the symbols of TB1 and TB2. After the DFT process 512, a subcarrier allocation/reallocation is performed at 514 (subcarriers (RE) may be mapped to contiguous IFFT bins), an inverse fast Fourier transform (IFFT) process 516 is performed, a parallel to serial conversion process 518 is performed at 518, a cyclic prefix addition process 520 is performed, a digital to analog conversion (DAC) 522 is performed, and an analog filter is applied to filter the output of the DAC 522, and the resulting signal may be transmitted as a single carrier waveform via an antenna.

Figure 6:
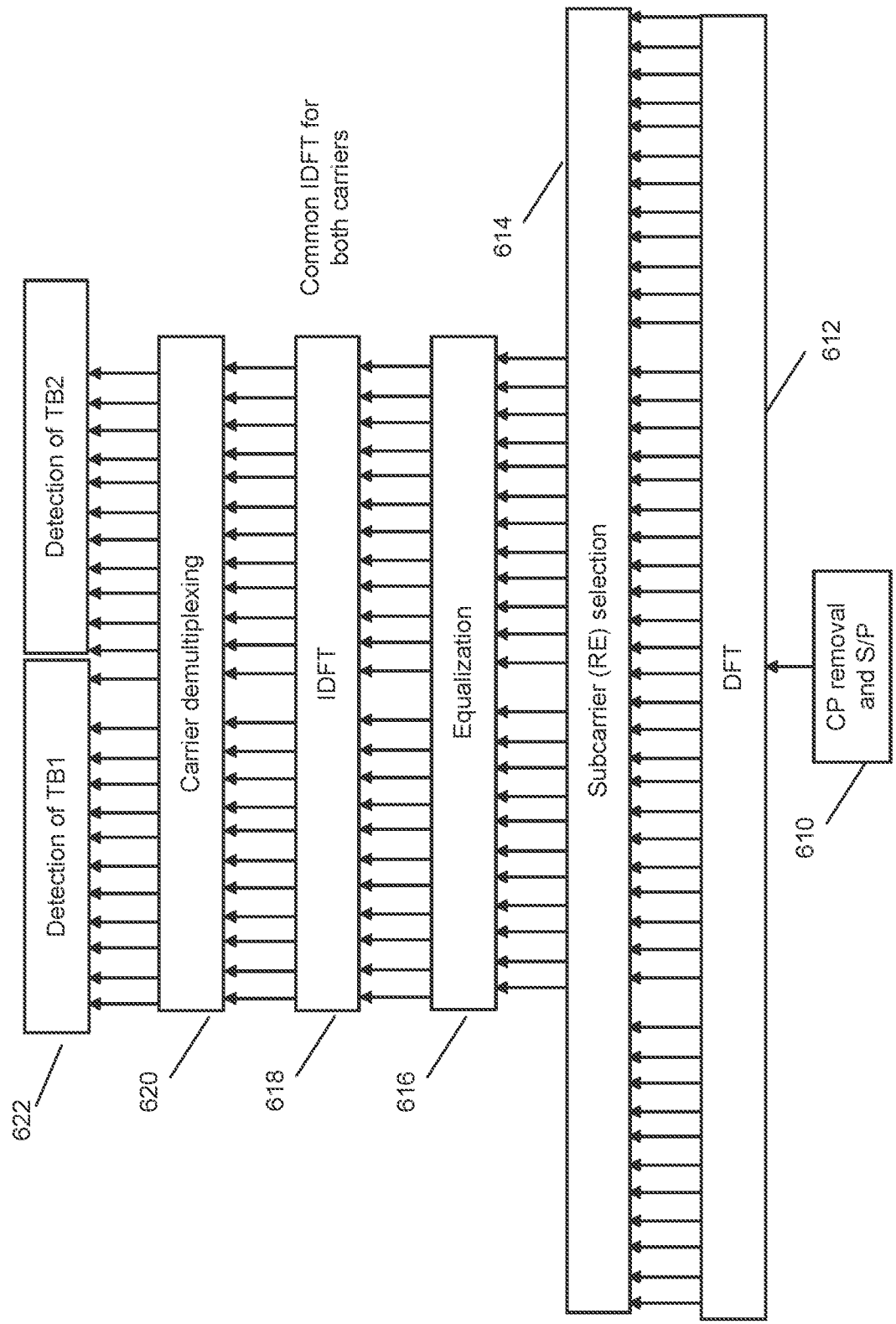
FIG. 6 is a diagram illustrating a receiver according to an example embodiment.

FIG. 6 is a diagram illustrating a receiver according to an example embodiment. At 610, after receiving the single carrier waveform via an antenna, at block 610, a cyclic prefix removal and a serial to parallel process is performed on the received signal. A subcarrier selection/reselection is performed at 614, an equalization is performed at 616, and an inverse discrete Fourier transform (IDFT) is performed at 618 for both UL CCs (or in which a common IDFT 618 is provided for both UL CCs). A carrier demultiplexing is performed at 620, and detection of symbols of TB1 and symbols of TB2 is performed at 622.

Example Advantages of the various example embodiment(s) may include, for example, one or more of: a reduction (or decrease) in MPR (maximum power reduction, which results in (or may be typically result in) increase in transmit (transmission) power for multiple CC transmission; Improved range or coverage; Improved spectrum utilization (guard band can be taken into use, e.g., resources or PRBs that previously may have been used as a guard band are now (as described herein) used for data transmission, and hence the PRBs of the two UL CCs may have contiguous PRBs); Overall, making uplink CA commercially more feasible, relevant, and/or more effective via improved range or coverage.

Some further examples will be provided.

Example 1. A method comprising: transmitting, by a user device to a wireless network node, data via a plurality of uplink component carriers including at least a first uplink component carrier and a second uplink component carrier; wherein a first subset of physical resource blocks for the first component carrier is contiguous with a second subset of physical resource blocks for the second component carrier; wherein the first component carrier and the second component carrier have a same power spectral density; and applying a modified radio frequency requirement by the user device wherein the modified radio frequency requirement impacts a transmission power of the first uplink component carrier and of the second uplink component carrier.

Example 2. The method of example 1, wherein the applying a modified radio frequency requirement comprises at least one of the following: applying, by the user device, a lower maximum power reduction, or a higher possible transmission power, based on the plurality of component carriers having contiguous subsets of physical resource blocks and the plurality of component carriers having a same power spectral density, as compared to where the plurality of component carriers have non-contiguous subsets of physical resource blocks and/or have different power spectral densities; transmitting, by the user device, a waveform having a lower peak to average power ratio (PAPR) based on the plurality of component carriers having contiguous subsets of physical resource blocks and the plurality of component carriers having a same power spectral density, as compared to where the plurality of component carriers have non-contiguous subsets of physical resource blocks and/or have different power spectral densities.

Example 3. The method of any of examples 1-2, wherein the plurality of uplink component carriers, including at least the first uplink component carrier and the second uplink component carrier, are provided within a wideband uplink carrier, wherein the wideband uplink carrier includes a common set of physical resource blocks, and wherein the physical resource blocks of the wideband uplink carrier have physical resource block alignment with both the first subset of physical resource blocks for the first component carrier and the second subset of physical resource blocks for the second component carrier.

Example 4. The method of any of examples 1-3, wherein there is physical resource block alignment of the physical resource blocks of the wideband uplink carrier with the physical resource blocks of the first subset of physical resource blocks for the first component carrier and the second subset of physical resource blocks for the second component carrier.

Example 5. The method of example 4, wherein the physical resource block alignment comprises at least one of the following: the physical resource blocks of the common set of physical resource blocks, the first subset of physical resource blocks for the first component carrier, and the second subset of physical resource blocks for the second component carrier are provided within or as part of a common grid of physical resource blocks; and/or a starting position of each physical resource block of the common set of physical resource blocks, the first subset of physical resource blocks for the first component carrier, and the second subset of physical resource blocks for the second component carrier are provided at an integer multiple of N subcarriers, where N is also an integer.

Example 6. The method of any of examples 1-5, further comprising using a same modulation scheme to modulate data for the plurality of component carriers; and applying a single Discrete Fourier Transform (DFT) process to modulated symbols of the plurality of component carriers to generate a single carrier waveform that has a lower maximum power reduction, or a higher transmission power, as compared to using different modulation schemes to modulate data for the plurality of component carriers and/or applying different Discrete Fourier Transform (DFT) processes to the modulated symbols of the plurality of component carriers.

Example 7. The method of any of examples 1-6: wherein the plurality of uplink component carriers, including at least the first uplink component carrier and the second uplink component carrier, are provided within a wideband uplink carrier; and wherein the wideband uplink carrier includes physical resource block alignment with the plurality of uplink component carriers.

Example 8. The method of any of examples 1-7, further comprising: applying a cyclic prefix-Orthogonal Frequency Division Multiplexing (CP-OFDM) process to modulated symbols of the plurality of component carriers to generate a waveform that has a lower maximum power reduction, or a higher transmission power, as compared to where the plurality of component carriers have non-contiguous subsets of physical resource blocks and/or have different power spectral densities and/or do not use or apply a CP-OFDM process to modulated symbols of the plurality of component carriers.

Example 9. The method of any of examples 1-8, wherein the first uplink component carrier and the second uplink component carrier are transmitted as a single carrier waveform by applying a single Discrete Fourier Transform (DFT) process or a single Discrete Fourier Transform-Spread-Orthogonal Frequency Division Multiplexing (DFT-S-OFDM) process both to modulated symbols of a first transport block of the first uplink component carrier and to modulated symbols of a second transport block of the second uplink component carrier.

Example 10. The method of example 9, wherein the applying a modified radio frequency requirement by the user device comprises: applying, by the user device, a lower maximum power reduction, or a higher possible transmission power, based on the first uplink component carrier and the second uplink component carrier being transmitted as a single carrier waveform by the applying the single Discrete Fourier Transform (DFT) process or the single Discrete Fourier Transform-Spread-Orthogonal Frequency Division Multiplexing (DFT-S-OFDM) process.

Example 11. The method of any of examples 1-10 wherein a common modulation scheme is used for the plurality of component carriers, including both the first uplink component carrier and the second uplink component carrier.

Example 12. The method of any of examples 1-11, wherein: a first hybrid ARQ (HARQ) process is provided for the first uplink component carrier to enable the user device to receive acknowledgements and/or negative acknowledgements for data transmitted by the user device via the first uplink component carrier; and a second hybrid ARQ (HARQ) process, separate from the first HARQ process, is provided for the second uplink component carrier to enable the user device to receive acknowledgements and/or negative acknowledgements for data transmitted by the user device via the second uplink component carrier.

Example 13. The method of any of examples 1-12, wherein: a first hybrid ARQ (HARQ) process-specific new data indicator (NDI) is provided for the first uplink component carrier to enable the user device to receive scheduling for new data transmission and/or for retransmission of data transmitted by the user device via the first uplink component carrier; and a second hybrid ARQ (HARQ) process-specific new data indicator (NDI), separate from the first HARQ process, is provided for the second uplink component carrier to enable the user device to receive scheduling for new data transmission and/or for retransmission of data transmitted by the user device via the second uplink component carrier.

Example 14. The method of any of examples 1-13, wherein modulated symbols of the first uplink component carrier are provided in a first transport block, and modulated symbols of the second uplink component carrier are provided in a second transport block.

Example 15. The method of example 14, wherein: a single Discrete Fourier Transform-Spread-Orthogonal Frequency Division Multiplexing (DFT-S-OFDM) process is applied both to modulated symbols of the first transport block of the first uplink component carrier and to modulated symbols of the second transport block of the second uplink component carrier; and at least one of the following is performed: the modulated symbols of the first transport block are multiplexed in time with modulated symbols of the second transport block, within a symbol; or multiplexing of the transport blocks is performed by the modulated symbols of the first transport block are provided on a first set of consecutive symbols, and the modulated symbols of the second transport block are provided on a second set of consecutive symbols that occurs after the first set of consecutive symbols.

Example 16. The method of any of examples 1-15, wherein a separate physical uplink control channel is provided for one of the first uplink component carrier and the second uplink component carrier.

Example 17. The method of any of examples 1-16, wherein uplink control information is multiplexed with modulated symbols of one of the first uplink component carrier or the second uplink component carrier.

Example 18. The method of any of examples 1-17, wherein a joint demodulation reference signal is transmitted by the user device for both the first uplink component carrier and the second uplink component carrier, and wherein the joint demodulation reference signal is defined according to a total allocation size or is defined to cover allocated physical resource blocks of both the first uplink component carrier and the second uplink component carrier.

Example 19. The method of any of examples 1-18, wherein the plurality of uplink component carriers, including at least the first uplink component carrier and the second uplink component carrier, are provided within a wideband uplink carrier; and wherein at least one of the following is performed: providing a first sounding reference signal for the first uplink component carrier, and providing a second sounding reference signal for the second uplink component carrier; providing a combined or joint sounding reference signal for the wideband uplink carrier.

Example 20. The method of any of examples 1-19, further comprising: using a same modulation scheme to modulate data for the first uplink component carrier and the second uplink component carrier; wherein the first uplink component carrier and the second uplink component carrier are provided within a wideband uplink carrier, wherein the wideband uplink carrier includes a common set of physical resource blocks including the first subset of physical resource blocks and the second subset of physical resource blocks; applying at least one of 1) a single Discrete Fourier Transform (DFT) process or 2) a single Discrete Fourier Transform-Spread-Orthogonal Frequency Division Multiplexing (DFT-S-OFDM) process to modulated symbols of the wideband uplink carrier including modulated symbols of both the first uplink component carrier and the second uplink component carrier; and transmitting a single carrier waveform based on an output of the single DFT process or an output of the single DFT-S-OFDM process applied to the modulated symbols of the wideband uplink carrier.

Example 21. An apparatus comprising means for performing the method of any of examples 1-20.

Example 22. A non-transitory computer-readable storage medium comprising instructions stored thereon that, when executed by at least one processor, are configured to cause a computing system to perform the method of any of examples 1-20.

23. An apparatus comprising: at least one processor; and at least one memory including computer program code; the at least one memory and the computer program code configured to, with the at least one processor, cause the apparatus at least to perform the method of any of examples 1-20.

Example 24. An apparatus comprising: at least one processor; and at least one memory including computer program code; the at least one memory and the computer program code configured to, with the at least one processor, cause the apparatus at least to: transmit, by a user device to a wireless network node, data via a plurality of uplink component carriers including at least a first uplink component carrier and a second uplink component carrier; wherein a first subset of physical resource blocks for the first component carrier is contiguous with a second subset of physical resource blocks for the second component carrier; wherein the first component carrier and the second component carrier have a same power spectral density; and apply a modified radio frequency requirement by the user device wherein the modified radio frequency requirement impacts a transmission power of the first uplink component carrier and of the second uplink component carrier.

Example 25. The apparatus of example 24, wherein the at least one processor and the computer program code configured to cause the apparatus to apply a modified radio frequency requirement comprises the at least one processor and the computer program code configured to cause the apparatus to perform at least one of the following: apply, by the user device, a lower maximum power reduction, or a higher possible transmission power, based on the plurality of component carriers having contiguous subsets of physical resource blocks and the plurality of component carriers having a same power spectral density, as compared to where the plurality of component carriers have non-contiguous subsets of physical resource blocks and/or have different power spectral densities; or transmit, by the user device, a waveform having a lower peak to average power ratio (PAPR) based on the plurality of component carriers having contiguous subsets of physical resource blocks and the plurality of component carriers having a same power spectral density, as compared to where the plurality of component carriers have non-contiguous subsets of physical resource blocks and/or have different power spectral densities.

Example 26. The apparatus of any of examples 24-25, wherein the plurality of uplink component carriers, including at least the first uplink component carrier and the second uplink component carrier, are provided within a wideband uplink carrier, wherein the wideband uplink carrier includes a common set of physical resource blocks, and wherein the physical resource blocks of the wideband uplink carrier have physical resource block alignment with both the first subset of physical resource blocks for the first component carrier and the second subset of physical resource blocks for the second component carrier.

Example 27. The apparatus of any of examples 24-26, wherein there is physical resource block alignment of the physical resource blocks of the wideband uplink carrier with the physical resource blocks of the first subset of physical resource blocks for the first component carrier and the second subset of physical resource blocks for the second component carrier.

Example 28. The apparatus of example 27, wherein the physical resource block alignment comprises at least one of the following: the physical resource blocks of the common set of physical resource blocks, the first subset of physical resource blocks for the first component carrier, and the second subset of physical resource blocks for the second component carrier are provided within or as part of a common grid of physical resource blocks; and/or a starting position of each physical resource block of the common set of physical resource blocks, the first subset of physical resource blocks for the first component carrier, and the second subset of physical resource blocks for the second component carrier are provided at an integer multiple of N subcarriers, where N is also an integer.

Example 29. The apparatus of any of examples 24-28, wherein the at least one processor and the computer program code configured to further cause the apparatus to: use a same modulation scheme to modulate data for the plurality of component carriers; and apply a single Discrete Fourier Transform (DFT) process to modulated symbols of the plurality of component carriers to generate a single carrier waveform that has a lower maximum power reduction, or a higher transmission power, as compared to using different modulation schemes to modulate data for the plurality of component carriers and/or applying different Discrete Fourier Transform (DFT) processes to the modulated symbols of the plurality of component carriers.

Example 30. The apparatus of any of examples 24-29: wherein the plurality of uplink component carriers, including at least the first uplink component carrier and the second uplink component carrier, are provided within a wideband uplink carrier; and wherein the wideband uplink carrier includes physical resource block alignment with the plurality of uplink component carriers.

Example 31. The apparatus of any of examples 24-30, the at least one processor and the computer program code configured to cause the apparatus to further: apply a cyclic prefix-Orthogonal Frequency Division Multiplexing (CP-OFDM) process to modulated symbols of the plurality of component carriers to generate a waveform that has a lower maximum power reduction, or a higher transmission power, as compared to where the plurality of component carriers have non-contiguous subsets of physical resource blocks and/or have different power spectral densities and/or do not use or apply a CP-OFDM process to modulated symbols of the plurality of component carriers.

Example 32. The apparatus of any of examples 24-31, wherein the first uplink component carrier and the second uplink component carrier are transmitted as a single carrier waveform by applying a single Discrete Fourier Transform (DFT) process or a single Discrete Fourier Transform-Spread-Orthogonal Frequency Division Multiplexing (DFT-S-OFDM) process both to modulated symbols of a first transport block of the first uplink component carrier and to modulated symbols of a second transport block of the second uplink component carrier.

Example 33. The apparatus of example 32, wherein the at least one processor and the computer program code configured to cause the apparatus to apply a modified radio frequency requirement by the user device comprises the at least one processor and the computer program code configured to cause the apparatus to: apply, by the user device, a lower maximum power reduction, or a higher possible transmission power, based on the first uplink component carrier and the second uplink component carrier being transmitted as a single carrier waveform by the applying the single Discrete Fourier Transform (DFT) process or the single Discrete Fourier Transform-Spread-Orthogonal Frequency Division Multiplexing (DFT-S-OFDM) process.

Example 34. The apparatus of any of examples 24-33 wherein a common modulation scheme is used for the plurality of component carriers, including both the first uplink component carrier and the second uplink component carrier.

Example 35. The apparatus of any of examples 24-34, wherein: a first hybrid ARQ (HARQ) process is provided for the first uplink component carrier to enable the user device to receive acknowledgements and/or negative acknowledgements for data transmitted by the user device via the first uplink component carrier; and a second hybrid ARQ (HARQ) process, separate from the first HARQ process, is provided for the second uplink component carrier to enable the user device to receive acknowledgements and/or negative acknowledgements for data transmitted by the user device via the second uplink component carrier.

Example 36. The apparatus of any of examples 24-35, wherein a first hybrid ARQ (HARQ) process-specific new data indicator (NDI) is provided for the first uplink component carrier to enable the user device to receive scheduling for new data transmission and/or for retransmission of data transmitted by the user device via the first uplink component carrier; and a second hybrid ARQ (HARQ) process-specific new data indicator (NDI), separate from the first HARQ process, is provided for the second uplink component carrier to enable the user device to receive scheduling for new data transmission and/or for retransmission of data transmitted by the user device via the second uplink component carrier.

Example 37. The apparatus of any of examples 24-36, wherein modulated symbols of the first uplink component carrier are provided in a first transport block, and modulated symbols of the second uplink component carrier are provided in a second transport block.

Example 38. The apparatus of example 37, wherein: a single Discrete Fourier Transform-Spread-Orthogonal Frequency Division Multiplexing (DFT-S-OFDM) process is applied both to modulated symbols of the first transport block of the first uplink component carrier and to modulated symbols of the second transport block of the second uplink component carrier; and at least one of the following is performed: the modulated symbols of the first transport block are multiplexed in time with modulated symbols of the second transport block, within a symbol; or multiplexing of the transport blocks is performed by the modulated symbols of the first transport block are provided on a first set of consecutive symbols, and the modulated symbols of the second transport block are provided on a second set of consecutive symbols that occurs after the first set of consecutive symbols.

Example 39. The apparatus of any of examples 23-38, wherein a separate physical uplink control channel is provided for one of the first uplink component carrier and the second uplink component carrier.

Example 40. The apparatus of any of examples 23-39, wherein uplink control information is multiplexed with modulated symbols of one of the first uplink component carrier or the second uplink component carrier.

Example 41. The apparatus of any of examples 23-40, wherein a joint demodulation reference signal is transmitted by the user device for both the first uplink component carrier and the second uplink component carrier, and wherein the joint demodulation reference signal is defined according to a total allocation size or is defined to cover allocated physical resource blocks of both the first uplink component carrier and the second uplink component carrier.

Example 42. The apparatus of any of examples 23-41, wherein the plurality of uplink component carriers, including at least the first uplink component carrier and the second uplink component carrier, are provided within a wideband uplink carrier; and wherein the at least one processor and the computer program code configured to cause the apparatus to perform at least one of the following: provide a first sounding reference signal for the first uplink component carrier, and providing a second sounding reference signal for the second uplink component carrier; or provide a combined or joint sounding reference signal for the wideband uplink carrier.

Example 43. The apparatus of any of examples 23-42, wherein the at least one processor and the computer program code configured to cause the apparatus to further: use a same modulation scheme to modulate data for the first uplink component carrier and the second uplink component carrier; wherein the first uplink component carrier and the second uplink component carrier are provided within a wideband uplink carrier, wherein the wideband uplink carrier includes a common set of physical resource blocks including the first subset of physical resource blocks and the second subset of physical resource blocks; apply at least one of 1) a single Discrete Fourier Transform (DFT) process or 2) a single Discrete Fourier Transform-Spread-Orthogonal Frequency Division Multiplexing (DFT-S-OFDM) process to modulated symbols of the wideband uplink carrier including modulated symbols of both the first uplink component carrier and the second uplink component carrier; and transmit a single carrier waveform based on an output of the single DFT process or an output of the single DFT-S-OFDM process applied to the modulated symbols of the wideband uplink carrier.

Example 44. An apparatus comprising: means for transmitting, by a user device to a wireless network node, data via a plurality of uplink component carriers including at least a first uplink component carrier and a second uplink component carrier; wherein a first subset of physical resource blocks for the first component carrier is contiguous with a second subset of physical resource blocks for the second component carrier; wherein the first component carrier and the second component carrier have a same power spectral density; and means for applying a modified radio frequency requirement by the user device wherein the modified radio frequency requirement impacts a transmission power of the first uplink component carrier and of the second uplink component carrier.

Example 45. A non-transitory computer-readable storage medium comprising instructions stored thereon that, when executed by at least one processor, are configured to cause a computing system to: transmit, by a user device to a wireless network node, data via a plurality of uplink component carriers including at least a first uplink component carrier and a second uplink component carrier; wherein a first subset of physical resource blocks for the first component carrier is contiguous with a second subset of physical resource blocks for the second component carrier; wherein the first component carrier and the second component carrier have a same power spectral density; and apply a modified radio frequency requirement by the user device wherein the modified radio frequency requirement impacts a transmission power of the first uplink component carrier and of the second uplink component carrier.

Figure 7:
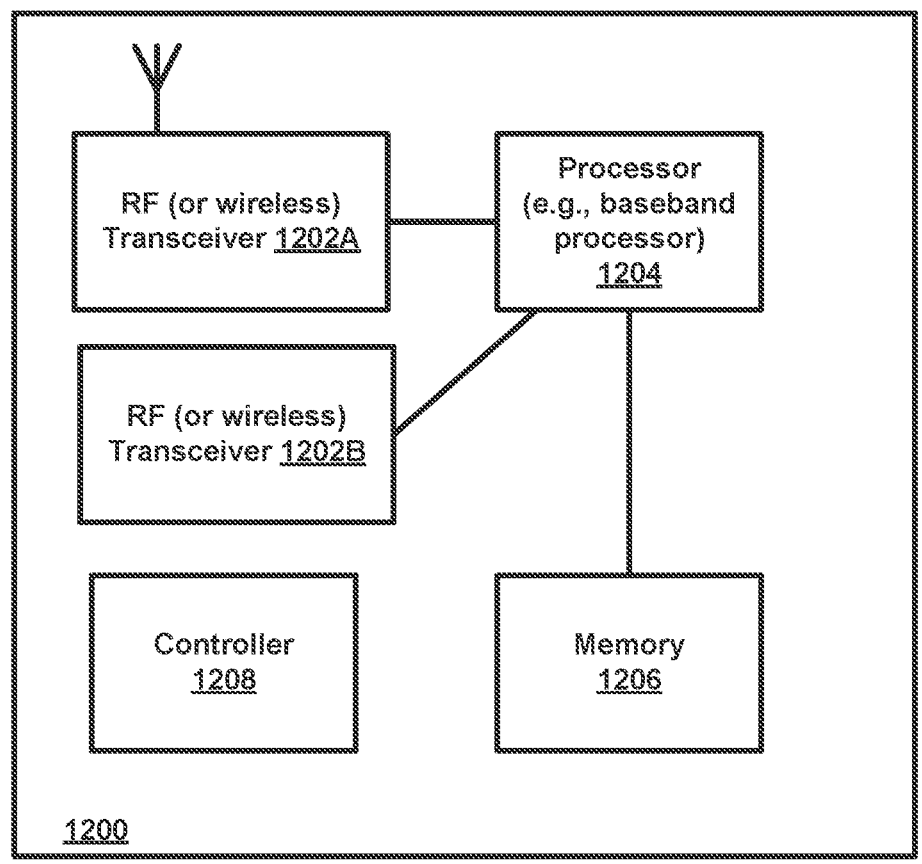
FIG. 7 is a block diagram of a wireless station node (e.g., wireless network node, user node or UE, relay node, or other node).

FIG. 7 is a block diagram of a wireless station or node (e.g., UE, user device, AP, BS, eNB, gNB, RAN node, network node, TRP, or other node) 1200 according to an example embodiment. The wireless station 1200 may include, for example, one or more (e.g., two as shown in FIG. 7) RF (radio frequency) or wireless transceivers 1202A, 1202B, where each wireless transceiver includes a transmitter to transmit signals and a receiver to receive signals. The wireless station also includes a processor or control unit/entity (controller) 1204 to execute instructions or software and control transmission and receptions of signals, and a memory 1206 to store data and/or instructions.

Processor 1204 may also make decisions or determinations, generate frames, packets or messages for transmission, decode received frames or messages for further processing, and other tasks or functions described herein. Processor 1204, which may be a baseband processor, for example, may generate messages, packets, frames or other signals for transmission via wireless transceiver 1202 (1202A or 1202B). Processor 1204 may control transmission of signals or messages over a wireless network, and may control the reception of signals or messages, etc., via a wireless network (e.g., after being down-converted by wireless transceiver 1202, for example). Processor 1204 may be programmable and capable of executing software or other instructions stored in memory or on other computer media to perform the various tasks and functions described above, such as one or more of the tasks or methods described above. Processor 1204 may be (or may include), for example, hardware, programmable logic, a programmable processor that executes software or firmware, and/or any combination of these. Using other terminology, processor 1204 and transceiver 1202 together may be considered as a wireless transmitter/receiver system, for example.

In addition, referring to FIG. 7, a controller (or processor) 1208 may execute software and instructions, and may provide overall control for the station 1200, and may provide control for other systems not shown in FIG. 7, such as controlling input/output devices (e.g., display, keypad), and/or may execute software for one or more applications that may be provided on wireless station 1200, such as, for example, an email program, audio/video applications, a word processor, a Voice over IP application, or other application or software.

In addition, a storage medium may be provided that includes stored instructions, which when executed by a controller or processor may result in the processor 1204, or other controller or processor, performing one or more of the functions or tasks described above.

According to another example embodiment, RF or wireless transceiver(s) 1202A/1202B may receive signals or data and/or transmit or send signals or data. Processor 1204 (and possibly transceivers 1202A/1202B) may control the RF or wireless transceiver 1202A or 1202B to receive, send, broadcast or transmit signals or data.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer, or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising: at least one processor; and
at least one memory including computer program code;
the at least one memory and the computer program code configured to, with the at least one processor, cause the apparatus at least to:
transmit data via a plurality of uplink component carriers including at least a first uplink component carrier and a second uplink component carrier;
wherein a first subset of physical resource blocks for the first component carrier is contiguous with a second subset of physical resource blocks for the second component carrier;
wherein the first component carrier and the second component carrier have a same power spectral density; and
apply a modified radio frequency requirement wherein the modified radio frequency requirement impacts a transmission power of the first uplink component carrier and of the second uplink component carrier, wherein the at least one memory and the computer program code configured to, with the at least one processor, further cause the apparatus at least to:
  transmit a joint demodulation reference signal for both the first uplink component carrier and the second uplink component carrier, and
  wherein the joint demodulation reference signal is defined according to a total allocation size or is defined to cover allocated physical resource blocks of both the first uplink component carrier and the second uplink component carrier.

2. The apparatus of claim 1, wherein the applying the modified radio frequency requirement comprises:
  applying a lower maximum power reduction, or a higher possible transmission power, based on the plurality of component carriers having contiguous subsets of physical resource blocks and the plurality of component carriers having a same power spectral density, as compared to where the plurality of component carriers have non-contiguous subsets of physical resource blocks and/or have different power spectral densities; and/or
  transmitting a waveform having a lower peak to average power ratio based on the plurality of component carriers having contiguous subsets of physical resource blocks and the plurality of component carriers having a same power spectral density, as compared to where the plurality of component carriers have non-contiguous subsets of physical resource blocks and/or have different power spectral densities.

3. The apparatus of claim 1, wherein the plurality of uplink component carriers, including at least the first uplink component carrier and the second uplink component carrier, are provided within a wideband uplink carrier, wherein the wideband uplink carrier includes a common set of physical resource blocks, and wherein the physical resource blocks of the wideband uplink carrier have physical resource block alignment with both the first subset of physical resource blocks for the first component carrier and the second subset of physical resource blocks for the second component carrier.

4. The apparatus of claim 1, wherein there is physical resource block alignment of the physical resource blocks of a wideband uplink carrier with the physical resource blocks of the first subset of physical resource blocks for the first component carrier and the second subset of physical resource blocks for the second component carrier.

5. The apparatus of claim 4, wherein the physical resource block alignment comprises:
  the physical resource blocks of the common set of physical resource blocks, the first subset of physical resource blocks for the first component carrier, and the second subset of physical resource blocks for the second component carrier are provided within or as part of a common grid of physical resource blocks; and/or
  a starting position of each physical resource block of the common set of physical resource blocks.

6. The apparatus of claim 1, wherein the at least one memory and the computer program code configured to, with the at least one processor, further cause the apparatus at least to:
  use a same modulation scheme to modulate data for the plurality of component carriers; and
  apply a single Discrete Fourier Transform (DFT) process to modulated symbols of the plurality of component carriers to generate a single carrier waveform that has a lower maximum power reduction, or a higher transmission power, as compared to using different modulation schemes to modulate data for the plurality of component carriers and/or applying different DFT processes to the modulated symbols of the plurality of component carriers.

7. The apparatus of claim 1:
  wherein the plurality of uplink component carriers, including at least the first uplink component carrier and the second uplink component carrier, are provided within a wideband uplink carrier; and
  wherein the wideband uplink carrier includes physical resource block alignment with the plurality of uplink component carriers.

8. The apparatus of claim 1, wherein the at least one memory and the computer program code configured to, with the at least one processor, further cause the apparatus at least to:
  apply a cyclic prefix-Orthogonal Frequency Division Multiplexing (CP-OFDM) process to modulated symbols of the plurality of component carriers to generate a waveform that has a lower maximum power reduction, or a higher transmission power, as compared to where the plurality of component carriers have non-contiguous subsets of physical resource blocks and/or have different power spectral densities and/or do not use or apply a CP-OFDM process to modulated symbols of the plurality of component carriers.

9. The apparatus of claim 1, wherein the first uplink component carrier and the second uplink component carrier are transmitted as a single carrier waveform by applying a single Discrete Fourier Transform (DFT) process or a single Discrete Fourier Transform-Spread-Orthogonal Frequency Division Multiplexing (DFT-S-OFDM) process both to modulated symbols of a first transport block of the first uplink component carrier and to modulated symbols of a second transport block of the second uplink component carrier.

10. The apparatus of claim 9, wherein the applying the modified radio frequency requirement comprises:
  applying a lower maximum power reduction, or a higher possible transmission power, based on the first uplink component carrier and the second uplink component carrier being transmitted as a single carrier waveform by the applying the single DFT process or the single DFT-S-OFDM process.

11. The apparatus of claim 1 wherein a common modulation scheme is used for the plurality of component carriers, including both the first uplink component carrier and the second uplink component carrier.

12. The apparatus of claim 1, wherein:
  a first hybrid automatic repeat request (HARQ) process is provided for the first uplink component carrier to enable the apparatus to receive acknowledgements and/or negative acknowledgements for data transmitted by the apparatus via the first uplink component carrier; and
  a second HARQ process, separate from the first HARQ process, is provided for the second uplink component carrier to enable the apparatus to receive acknowledgements and/or negative acknowledgements for data transmitted by the apparatus via the second uplink component carrier.

13. The apparatus of claim 1, wherein:
  a first hybrid automatic repeat request (HARQ) process-specific new data indicator (NDI) is provided for the first uplink component carrier to enable the apparatus to receive scheduling for new data transmission and/or for retransmission of data transmitted by the apparatus via the first uplink component carrier; and a second HARQ process-specific NDI, separate from the first HARQ process-specific NDI, is provided for the second uplink component carrier to enable the apparatus to receive scheduling for new data transmission and/or for retransmission of data transmitted by the apparatus via the second uplink component carrier.

14. The apparatus of claim 1, wherein modulated symbols of the first uplink component carrier are provided in a first transport block, and modulated symbols of the second uplink component carrier are provided in a second transport block.

15. The apparatus of claim 14, wherein the at least one memory and the computer program code configured to, with the at least one processor, further cause the apparatus at least to:
   apply a single Discrete Fourier Transform-Spread-Orthogonal Frequency Division Multiplexing (DFT-S-OFDM) process both to modulated symbols of the first transport block of the first uplink component carrier and to modulated symbols of the second transport block of the second uplink component carrier; and
   at least one of:
   multiplex the modulated symbols of the first transport block in time with modulated symbols of the second transport block, within a symbol; or multiplex the transport blocks by providing the modulated symbols of the first transport block on a first set of consecutive symbols and providing the modulated symbols of the second transport block on a second set of consecutive symbols that occurs after the first set of consecutive symbols.

16. The apparatus of claim 1, wherein a separate physical uplink control channel is provided for one of the first uplink component carrier and the second uplink component carrier.

17. The apparatus of claim 1, wherein uplink control information is multiplexed with modulated symbols of one of the first uplink component carrier or the second uplink component carrier.

18. The apparatus of claim 1, wherein the plurality of uplink component carriers, including at least the first uplink component carrier and the second uplink component carrier, are provided within a wideband uplink carrier; and
   wherein the at least one memory and the computer program code configured to, with the at least one processor, further cause the apparatus at least to:
   provide a first sounding reference signal for the first uplink component carrier, and providing a second sounding reference signal for the second uplink component carrier; and/or
   provide a combined or joint sounding reference signal for the wideband uplink carrier.

19. The apparatus of claim 1, wherein the at least one memory and the computer program code configured to, with the at least one processor, further cause the apparatus at least to:
   use a same modulation scheme to modulate data for the first uplink component carrier and the second uplink component carrier;
   wherein the first uplink component carrier and the second uplink component carrier are provided within a wideband uplink carrier, wherein the wideband uplink carrier includes a common set of physical resource blocks including the first subset of physical resource blocks and the second subset of physical resource blocks;
   apply at least one of a single Discrete Fourier Transform (DFT) process or a single Discrete Fourier Transform-Spread-Orthogonal Frequency Division Multiplexing (DFT-S-OFDM) process to modulated symbols of the wideband uplink carrier including modulated symbols of both the first uplink component carrier and the second uplink component carrier; and
   transmit a single carrier waveform based on an output of the single DFT process or an output of the single DFT-S-OFDM process applied to the modulated symbols of the wideband uplink carrier.

* * * * *